(12) United States Patent
Becker et al.

(10) Patent No.: US 8,407,807 B2
(45) Date of Patent: Mar. 26, 2013

(54) DYNAMIC ASSERTION PROVIDERS FOR LOGIC-BASED SECURITY POLICY LANGUAGES

(75) Inventors: Moritz Y. Becker, Cambridge (GB); Jason Forrest Mackay, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 12/786,443

(22) Filed: May 25, 2010

(65) Prior Publication Data

US 2011/0296533 A1 Dec. 1, 2011

(51) Int. Cl.
*G06F 7/00* (2006.01)
(52) U.S. Cl. ............... 726/30; 726/9; 726/151; 707/783
(58) Field of Classification Search ............... 726/9, 30; 707/783; 713/151
See application file for complete search history.

(56) References Cited

U.S. PATENT DOCUMENTS

| | | | |
|---|---|---|---|
| 7,076,557 B1* | 7/2006 | LaMacchia et al. | 709/229 |
| 7,437,718 B2* | 10/2008 | Fournet et al. | 717/133 |
| 8,065,308 B2* | 11/2011 | Shadmon et al. | 707/741 |
| 2008/0028461 A1 | 1/2008 | Pouliot | |
| 2008/0066171 A1* | 3/2008 | Becker et al. | 726/9 |
| 2009/0164469 A1* | 6/2009 | Becker et al. | 707/9 |
| 2009/0165110 A1* | 6/2009 | Becker et al. | 726/9 |

OTHER PUBLICATIONS

Al-Muhtadi, et al., "Cerberus: A Context-Aware Security Scheme for Smart Spaces*", Retrieved at << http:// citeseerx.ist.psu.edu/viewdoc/download?doi=10.1.1.13.2802&rep=rep1&type=pdf >>, PERCOM, Proceedings of the First IEEE International Conference on Pervasive Computing and Communications, Mar. 23-26, 2003.
Alessandri, Dominique., "Attack-class-based Analysis of Intrusion Detection Systems", Retrieved at << http://homepage.swissonline.ch/alessandri/Alessandri-Thesis.pdf >>, May 2004.
Becker, Moritz Y., "SecPAL: Formalization and Extensions", Retrieved at << http://research.microsoft.com/pubs/102613/SecPAL%20formalization%20and%20extensions%202009-09-21%20rev%2002.pdf >>, Technical Report, MSR-TR-2009-127, Sep. 2009.
Saklikar, et al., "Next Steps for Security Assertion Markup Language (SAML)", Retrieved at << http://delivery.acm.org/10.1145/1320000/1314427/p52-saklikar.pdf?key1=1314427&key2=6463138621&coll=GUIDE&dl=GUIDE&CFID=81486738&CFTOKEN=22877016 >>, Workshop on Secure Web Services, Proceedings of the 2007 ACM workshop on Secure web services, Nov. 2-2, 2007.
Wilson, et al., "Flexible and Configurable Verification Policies with Omnibus", Retrieved at << http://www.springerlink.com/content/9543347t1h403181/fulltext.pdf >>, Journal on Software and Systems Modeling, Jul. 2008.
Al-Muhtadi, Jalal F., "An Intelligent Authentication Infrastructure for Ubiquitous Computing Environments", Retrieved at << http://citeseerx.ist.psu.edu/viewdoc/download?doi=10.1.1.84.3087&rep=rep1&type=pdf >>, 2005.

* cited by examiner

*Primary Examiner* — Beemnet Dada
*Assistant Examiner* — Sayed Beheshti Shirazi

(57) ABSTRACT

Architecture that employs dynamic assertion providers in logic-based security policy languages. The dynamic assertion providers provide a mechanism by which data can be processed in an efficient, goal-directed manner. The application of dynamic assertion providers enables the inferencing over type hierarchies, including hierarchies of personally identifiable information and also for file systems which are hierarchal in nature. When searching for facts to bind against for a given subgoal, dynamic assertion providers are also queried. These objects follow an interface which can implement an arbitrary method to provide facts to the logic engine in a goal-directed, on-demand manner. Hierarchical types can be implemented using a hierarchy provider.

20 Claims, 6 Drawing Sheets

DYNAMIC ASSERTION PROVIDERS FOR LOGIC-BASED SECURITY POLICY LANGUAGES

CROSS-REFERENCE TO RELATED APPLICATIONS

This application is related to pending U.S. patent application Ser. No. 11/530,564 entitled "SECURITY LANGUAGE EXPRESSIONS FOR LOGIC RESOLUTION" filed on Sep. 11, 2006, the entirety of which is incorporated by reference herein.

BACKGROUND

New designs for data security are continually evolving to keep professional information confidential and personal information private. Controlling access to information is an important aspect of securing the safety of electronic information. Access control has been implemented by authentication mechanisms such as passwords and digital certificates, which allow a resource-controlling entity to positively identify the requesting entity or information about the entity that it requires. Other authorization examples include access control lists (ACLs) and policy-based mechanisms. These mechanisms define the entities that may access a given resource, such as files in a file system, hardware devices, database information, and so forth.

Policy-based authorization systems verify that a policy authorizes access to data before allowing a requester to gain the data access. In some applications of logic-based security policy languages, reasoning over very large (or even infinite) sets of facts may be required; thus, access control can consume an inordinate amount of resources which then negatively impact system performance and the user experience.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture introduces dynamic assertion providers in logic-based security policy languages. The use of dynamic assertion providers alleviates the need to duplicate logical rules to achieve the desired semantics and without having to instantiate an entire database in memory, thereby resulting in significant memory and speed improvements in such applications.

The dynamic assertion providers provide a mechanism by which databases can be reasoned over in an efficient, goal-directed manner. The application of dynamic assertion providers enables the inferencing over type hierarchies, including hierarchies of, for example, personally identifiable information, which is needed for processing privacy policies, and also for file systems which are hierarchal in nature, for example.

The disclosed architecture efficiently solves the problem of reasoning over types hierarchies by using dynamic assertion providers. By defining an assertion provider which both characterizes the type hierarchy and dynamically provides any relevant facts on demand as the proof procedure progresses, queries can be efficiently computed over arbitrary graphs (e.g., acyclic), for example, file system hierarchies or type ontologies.

When searching for facts to bind against for a given subgoal, a set of dynamic assertion providers is also queried. These objects follow an interface which can implement an arbitrary method (e.g., SQL database, mathematical functions, hierarchies) to provide facts to the logic engine in a goal-directed, on-demand manner. Additionally, hierarchical types (a common requirement for security policy languages) can be implemented using a specialization of this mechanism, called a hierarchy provider.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
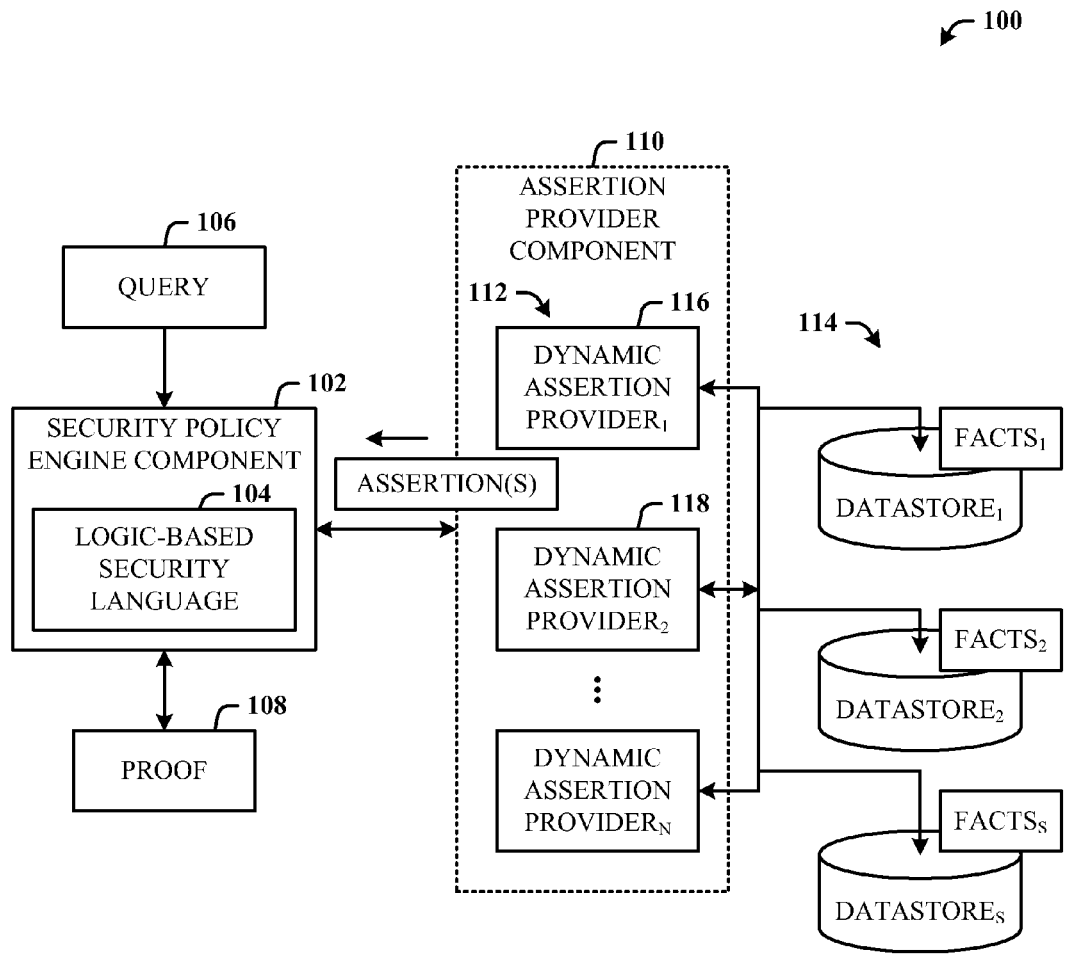
FIG. 1 illustrates security system in accordance with the disclosed architecture.

The disclosed architecture addresses the general problem of authorization or access control to systems and data—which user can access resources and under what conditions. A policy is the set of rules that govern who can access the resources and under what conditions. There are many different languages for specifying and guiding the active control policies. One particular language is SecPAL (Security Policy Assertion Language, by Microsoft Corporation). SecPAL can be used to write high level rules that indicate what entity (e.g., user, machine, programs, etc.) can access the resources. For example, if an entity seeks access to resources, a resource monitor (or reference monitor) in the system will each evaluate an access query against the policy. Access is allowed only if the query succeeds against the policy.

The resources are protected by the policy. The policy contains assertions and facts. Thus, when a user seeks access to resources a query is issued and evaluated against the policy and the policy assertions (e.g., written in SecPAL).

One part of the disclosed architecture addresses the problem of obtaining the assertions. Typically, the assertions are stored in main memory; however, there are circumstances where the assertions need to be dynamically generated when needed during evaluations. For example, there may be billions of relevant assertions stored in a policy database (e.g., relational). The policy database in this context refers to the policies and any other tokens. It is not perforant to fetch all of these assertions at the same time and store the assertions in main memory, and in fact may be impossible if the number of implied assertions is very large or infinite.

It is desirable to leave the assertions in the policy database and only instantiate those assertions when needed. This mechanism is referred to as a dynamic assertion provider. The dynamic assertion provider is an API (application programming interface) that provides on-the-fly access to assertions that may be stored in the policy database. The policy database is the set of logical assertions employed to make the access control decision. The general term database refers to relational databases (e.g., SQL) and non-relational databases such as distributed structured storage systems, object database management systems, cloud database systems, etc., which can also or separately stores the facts and policies.

The logic engine uses rules that can be written in a language called Datalog, which is a query and rule language for deductive databases. For example, a logical rule, "Joe can read a file foo if Joe has a credential from Company" can be created. The policy database stores these logical statements as policies.

When a query is posed, a logical deduction procedure (also referred to as a proofing evaluation process) is initiated to determine if the query is true or false in view of the set of policies. A "subgoal" is a condition given as part of a logical rule, which must be satisfied for the rule to hold. Continuing with the above example rule, "Joe can read a file foo if Joe has a credential from Company", the subgoal (condition) is "if Joe has a credential from Company", with the principal goal as "Joe can read a file foo". It is to be understood that there can be several subgoals as conditions to be evaluated to ultimately prove the goal.

The disclosed assertion provider mechanism allows the utilization of an infinite number of facts and rules for proof evaluation for security management. The dynamically of the assertion provider facilitates a goal-directed process where a fact is only created when needed in order to proceed on a proof. There is no longer a need to maintain the facts in memory until, and unless, actually needed. Moreover, dynamic assertion providers can be utilized to provide support for hierarchal resources.

Consider an example where a large company has a database of information where employees work, in what department, and attributes about employees associated with the user id. This can be potentially a large number of facts, and the number of individual facts about each employee can be substantial as well.

An efficient reasoning procedure instantiates the minimum number of facts required to complete the proof. Dynamic assertion providers take a goal (the top-level or head goal) as input. The query is then evaluated against a set of local policy statements which indicate the basic rules for deducing whether or not the goal is true. Each one of the rules may or may not require additional subgoals to be evaluated. The facts used to ultimately determine the truth of the goal may be buried in a large number of other facts not in main memory because of the enormity and limitations experienced by maintaining such fact information in memory.

Continuing with the above example, the process is to determine if Joe is a member of the accounting department. The logic engine has been supplemented with a set of dynamic assertion providers. Each time the logic engine initiates resolution of a subgoal of the proof, the engine accesses the dynamic assertion providers for facts that would help in resolving the subgoal ("Do you have any facts like Joe is a member of accounting?").

Thus, one particular implementation of the dynamic assertion provider can be to access an Active Directory™ (by Microsoft Corporation) datastore and attempt to find facts that confirm "Joe's user account is in the accounting department". The dynamic assertion provider is coded in a way that allows interfacing to the Active Directory datastore. The dynamic assertion provider facilitates access to an external datastore during construction of the proof, and fetching of the specific facts needed to proceed on the proof. If the assertion provider finds fact(s) that indicate "Joe is a member of the accounting department", the provider generates and returns an assertion to that effect on-the-fly (dynamically).

When searching for facts to bind against for a given subgoal, the dynamic assertion providers are also queried. These objects follow an interface which can implement an arbitrary method (e.g., SQL database, mathematical functions, hierarchies, etc.) to provide facts to the logic engine in a goal-directed, on-demand manner.

The disclosed architecture employs dynamic assertion providers in logic-based security policy engines. The architecture can be used to pull information from large databases, including, SQL (structured query language), hierarchical structures, graphs, etc., without having to duplicate logical rules to achieve the desired semantics, and without having to instantiate the entire database in memory as ground facts.

The architecture introduces a specific set or subset of types of assertion providers that allow reasoning over type hierarchies. Hierarchical types (a common requirement for security policy languages) are implemented using a specialization of this mechanism called a hierarchy provider. For example, policies can be written about personally identifiable information (PII), and then infer that since Home Address is of type PII, then Home Address is protected by any policy associated with that parent type, and so on up the hierarchy. This kind of inheritance is especially efficient to use when implemented using dynamic assertion providers.

Consider, for example, a policy "Joe can eat anything that is a food item". The problem is to determine if Joe can eat a banana. If a banana is a subtype of food, then the policy should satisfy that query. Unfortunately conventional logic is fairly strict in that if banana is not the same as the word food then the query will fail because banana is not food and there is no rule that says banana is a food.

Existing techniques create a rule that indicates "banana is food" and another rule that indicates "Joe can eat anything that is food". However, an enormous number of rules would need to be created for other foods, such as "apple is a food", and so on. Thus, for large ontologies the number of facts to assert can be enormous.

The disclosed architecture passes ontological relationships (the hierarchy) to a hierarchy dynamic assertion provider and then simply asks the assertion provider to reason over the facts and return an assertion. Accordingly, the fact that "banana is food" can be dynamically generated and then further passed to the logic engine (e.g., Datalog).

A second application of hierarchy dynamic assertion providers is to a hierarchy in file systems, such as URIs, as previously described. The requested hierarchal provider dynamically generates a rule that parses the last part of the URI string. The hierarchy is automatically encoded in the URI. Thus, there is no external reference to check. The rule is, if access is given to the parent then access is also given to the child of the parent. This is an efficient technique to process file systems and URI hierarchies because the URI itself embeds the information needed to understand the hierarchy. The technique is to obtain the child and then get the parent needed to prove access for the child. In other words, as a distinction between the type hierarchy and the URI kind of hierarchy, the type hierarchy needs external knowledge to determine if an item is a child type or something else. The hierarchy provider generates a dynamic rule that is similar to the rule in this example of the URI. Thus, for example, the hierarchy provider generates the assertion "Joe can eat the banana if Joe can eat food".

In the hierarchal resource scenario each object has only one parent. In the generalized ontology scenario an object may have more than one parent. In both cases, a general rule of creating these dynamic hierarchal rules is the same. It is also the case in general, for URI's, there is only one rule that gets returned because there is only one parent. For ontologies or general hierarchies, there can be multiple rules that are returned.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates security system 100 in accordance with the disclosed architecture. The security system 100 includes a security policy engine component 102 that employs a logic-based security language 104 to process an authorization query 106. The engine component 102 initiates build of a proof 108 having a goal and subgoals to be resolved to process the query 106. The system 100 also includes an assertion provider component 110 that includes one or more assertion providers 112 which process facts 114 to generate and return an assertion to the security policy engine component 102 to resolve a subgoal of the proof 108. The provider component 110 can represent any method(s) that obtain the assertions to be returned, ranging from databases and computable functions, to asking a user for a fact. Note that there may also be assertion providers 112 not connected to any datastore, but that "make up" the assertions or facts on-the-fly. For example, there may be an assertion provider that returns Sum(5,3,8) when given the subgoal Sum(5,3,x) to solve.

The facts 114 can be obtained from a single datastore or multiple datastores. Moreover, a single assertion provider (e.g., an assertion provide 116), can access a single datastore or multiple data stores. Still further, multiple assertion providers (e.g., assertion provider 116 and an assertion provider 118) can be designed to access a single datastore, each designed to access different sets of facts on the single datastore.

The assertion provider component 110 includes a type provider that defines types for processing hierarchical type ontologies, and facilitates access to external sources of facts not accessible by the engine component 102. The assertion provider component 110 returns an assertion that is expressed in the logic-based security language 104 for processing as part of the proof 108.

The assertion provider component 110 includes a hierarchy assertion provider that defines hierarchy types for processing type hierarchies. The hierarchy assertion provider receives a subgoal for permission on a hierarchical child resource and dynamically generates a rule that encodes hierarchy semantics. The engine component 102 processes the hierarchy semantics to search for a proof of an associated hierarchical parent resource to the hierarchical child resource.

The security policy engine component 102 fetches and dynamically translates the assertion during a clause resolution step. The logic-based security language 104 includes a safety condition that guarantees termination of a query evaluation process based on an infinite set of assertions returned by an assertion provider.

Figure 2:
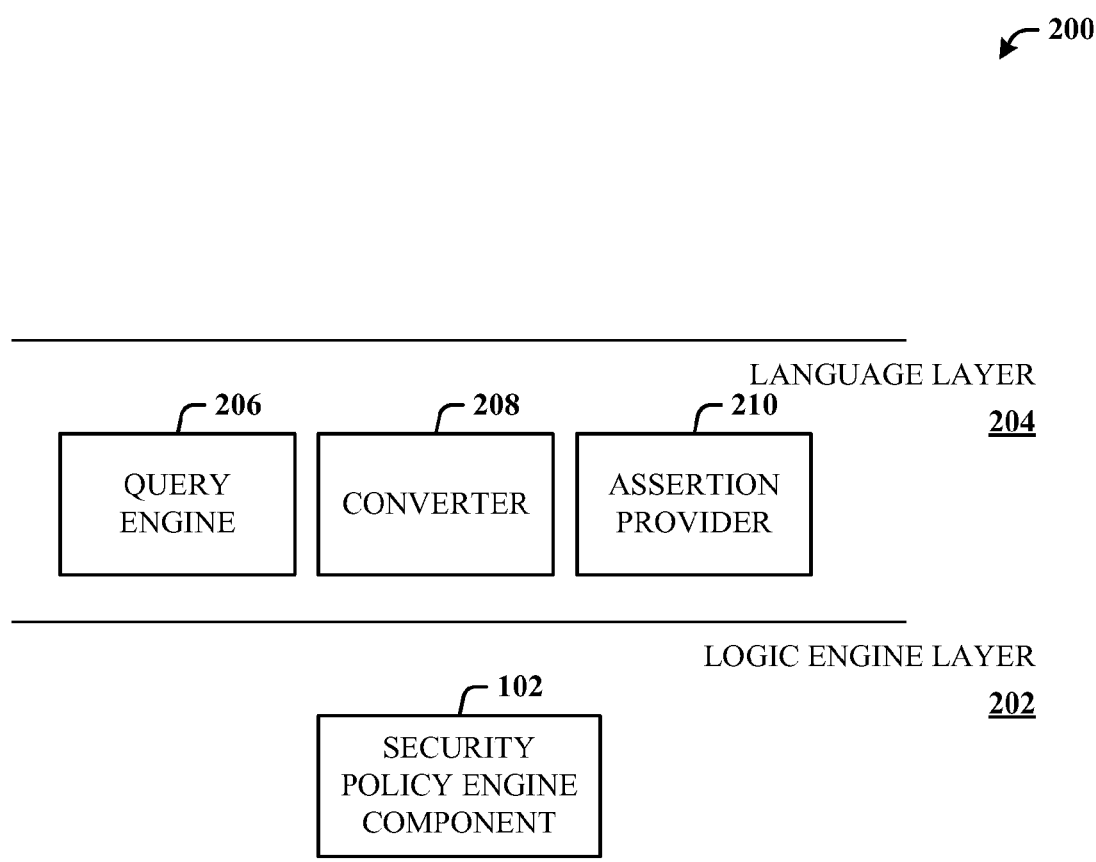
FIG. 2 illustrates several layers to the logic-based security implementation.

FIG. 2 illustrates several layers 200 to the logic-based security implementation. At a logic engine layer 202 is the logic engine (the security engine component 102) which initiates proof building for a given query. The logic engine includes a set of objects that implement a clause provider interface. For each subgoal encountered during the proof process a clause provider is called with a GetClauses( ) API, which is called with the current subgoal (a potentially ungrounded Datalog predicate) as a parameter. The clause provider then examines the subgoal and presents any Datalog facts it has, which may satisfy the given subgoal to the logic engine for processing. The list of provided clauses must be complete, since the tabling logic engine will not ask again.

A language layer 204 is the primary user-facing API. The user calls the logic engine component 102 through a query engine 206 (e.g., a query engine class), which actually performs the translation of the language assertions and query into the language of the logic engine layer (e.g., Datalog).

A subgoal, as part of the proof, is first converted to a security language statement (e.g., SecPAL) and then handed off to each assertion provider (e.g., an assertion provider 210), which then returns a set of assertions (e.g., SecPAL). The returned assertions are then converted back into the language (e.g., Datalog) of the language layer 204 using a converter 208 and the conversion context generated when the original query context was generated.

The aforementioned procedure is an optional implementation that can be utilized in order to facilitate the mapping of the Datalog proof to a proof in the original "security" policy language, and is not a requirement. For example, if construction of user-viewable proof trees is not required, facts can simply be provided at the Datalog layer. The proof then continues in Datalog. If successful, the Datalog proof can be examined (although difficult to understand for the average user who normally sees only the security policy language). In other words, dynamic assertion providers can be implemented directly at the Datalog level as well.

Figure 3:
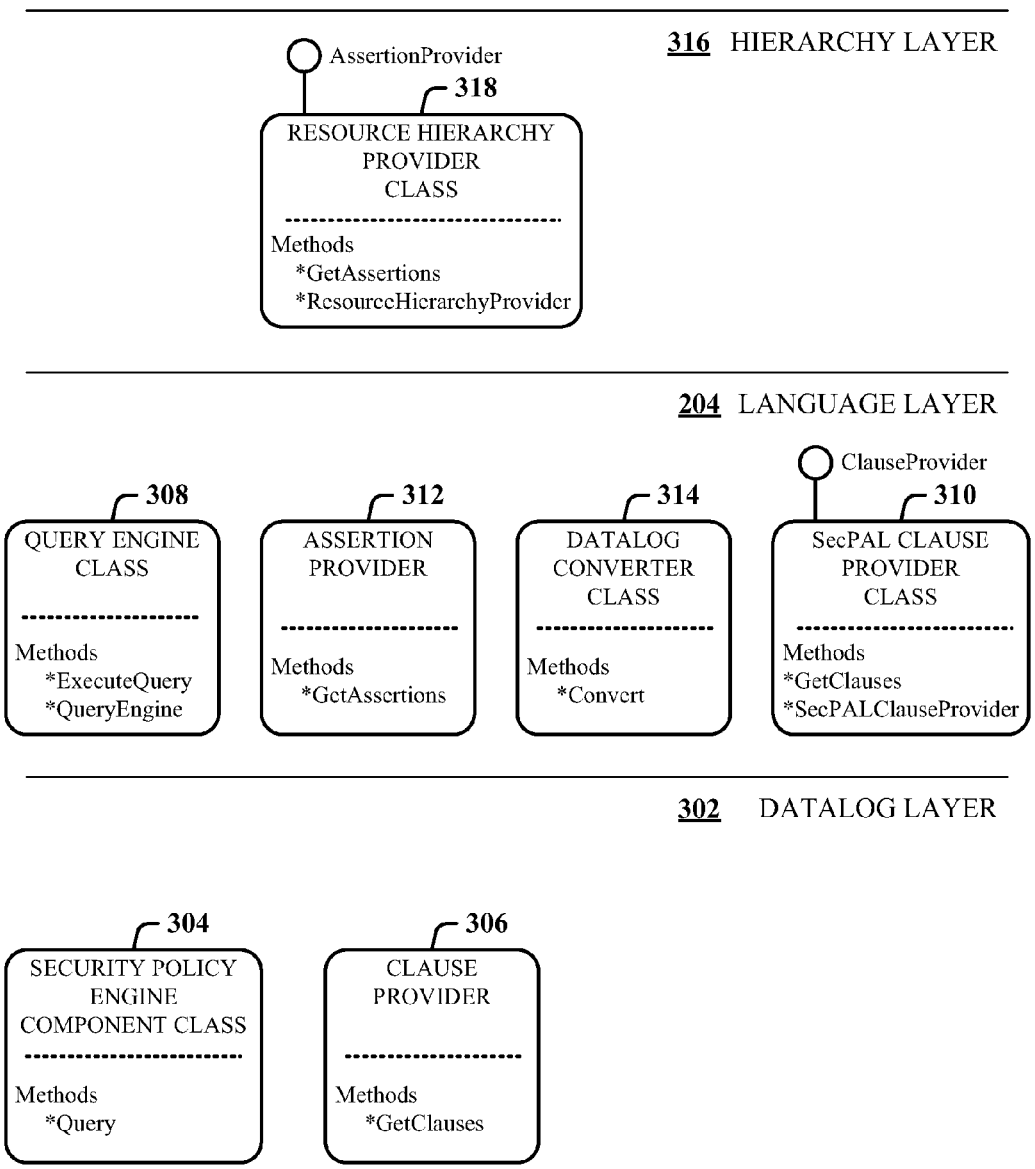
FIG. 3 illustrates an embodiment of a policy-based security system that employs a logic-based security language.

FIG. 3 illustrates an embodiment of a policy-based security system 300 that employs a logic-based security language. The security system 300 is described in terms of SecPAL as the security language and Datalog as the query and rule language. At a Datalog layer 302 (similar to the logic engine layer 202) is the logic engine (security policy engine component class 304) which builds proofs for a given query. The logic engine 304 includes a set of objects that implement one or more clause provider(s) 306 (e.g., ClauseProvider). For each subgoal encountered during the proof process the clause provider(s) 306 is called with a GetClauses( )API, which is called with the current subgoal (a potentially ungrounded Datalog predicate) as a parameter. The clause provider 306 then examines the subgoal and presents any Datalog facts it has, which may satisfy the given subgoal, to the logic engine 304 for processing. The list of provided clauses must be complete since the tabling logic engine will not ask again.

At the language layer 204 is the primary user-facing API surface. The user calls the logic engine 304 through a query engine 308 (QueryEngine) which performs the translation of the language assertions and query into Datalog. The query engine 308 provides a clause provider 310 (SecPAL-ClauseProvider) (an implementation of clause provider 306) to the logic engine 304. The clause provider 310 has a set of zero or more assertion provider(s) 312 (e.g., AssertionProvider) which the clause provider 310 calls. The assertion provider(s) 312 are the language layer equivalent to the clause provider 306 in the Datalog layer 302. The subgoal is first converted to a SecPAL statement and passed to each of the assertion provider(s) 312, which then returns a set of SecPAL assertions. These assertions are then converted back into Datalog (using a Datalog converter 314) and the conversion context generated when the original query context was generated.

At a hierarchy layer 316 are implementations of assertion provider(s). One example implementation is a resource hierarchy provider 318, which is the dynamic assertion provider for hierarchical URI's (uniform resource identifiers). The hierarchy assertion provider 318 takes a given subgoal for a permission on some hierarchical child resource (e.g., Joe can read http://www.foo.com/bar/baz.txt) and dynamically generates a rule that encodes the hierarchy semantics (e.g., Joe can read http://www.foo.com/bar/baz.txt if Joe can read http://www.foo.com/bar/). The logic engine 304 then proceeds to search for a proof that Joe can read the parent resource. This relationship is recursive.

As described herein, a change in the Datalog translation can involve the "can say" rule in SecPAL. First, a new function gen(F) is defined as facts F with each constant of hierarchical type replaced by a unique variable. For example, if F is p(/foo/, % x, /foo/, /foo/bar/), then gen(F) is p(% z1, % x, % z2,% z3). An assertion "A says F if $F_1, \ldots, F_n$ where c" is translated by applying a translation rule for both nested, as well as flat, facts F. Then, if F is nested, another translation rule can be applied, but on the assertion "A says gen(F)" instead.

In other words, once this assertion is created at the hierarchy layer 316, flow is to the language layer 204, where the assertion is converted from the high-level language (SecPAL) into the logic language (e.g., Datalog). From the language layer 204, the converted assertion is passed into the Datalog layer 302, Datalog clauses are provided to the logic engine 304 and the proof proceeds. This process can occur an arbitrary number of times as the proof progresses over an infinite number of facts, whether in an external datastore or not in a datastore. Thus, this architecture allows, in a goal-directed manner, to perform processing (e.g., reasoning over using a logical reasoning technique) a potentially infinite set of facts.

The set of facts F can be a fixed set to process. Some of those facts can exist outside of the logic engine 304, for example, in a datastore such as a SQL database, Active Directory, provided programmatically, etc. The facts can also be computed on-the-fly.

The system 300 can employ a finite number of assertion providers of which the logic engine 304 is informed such as during a registration process. The logic engine 304 is aware of the set of assertion providers to consult during the reasoning process. The assertion providers can be configured to be focused on certain databases or sources of information, although this is not a requirement. For example, the system 300 can include an Active Directory assertion provider, a SQL assertion provider, and/or a single assertion provider that handles both. Moreover, it is arbitrary how a dynamic assertion provider is written. It is possible to have two assertion providers working generally on the same datasource or each operating on separate areas of the same datasource. It can also be the case where processing by the logic engine 304 requires that the engine 304 go back out to another assertion provider to get additional facts to resolve the subgoal.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
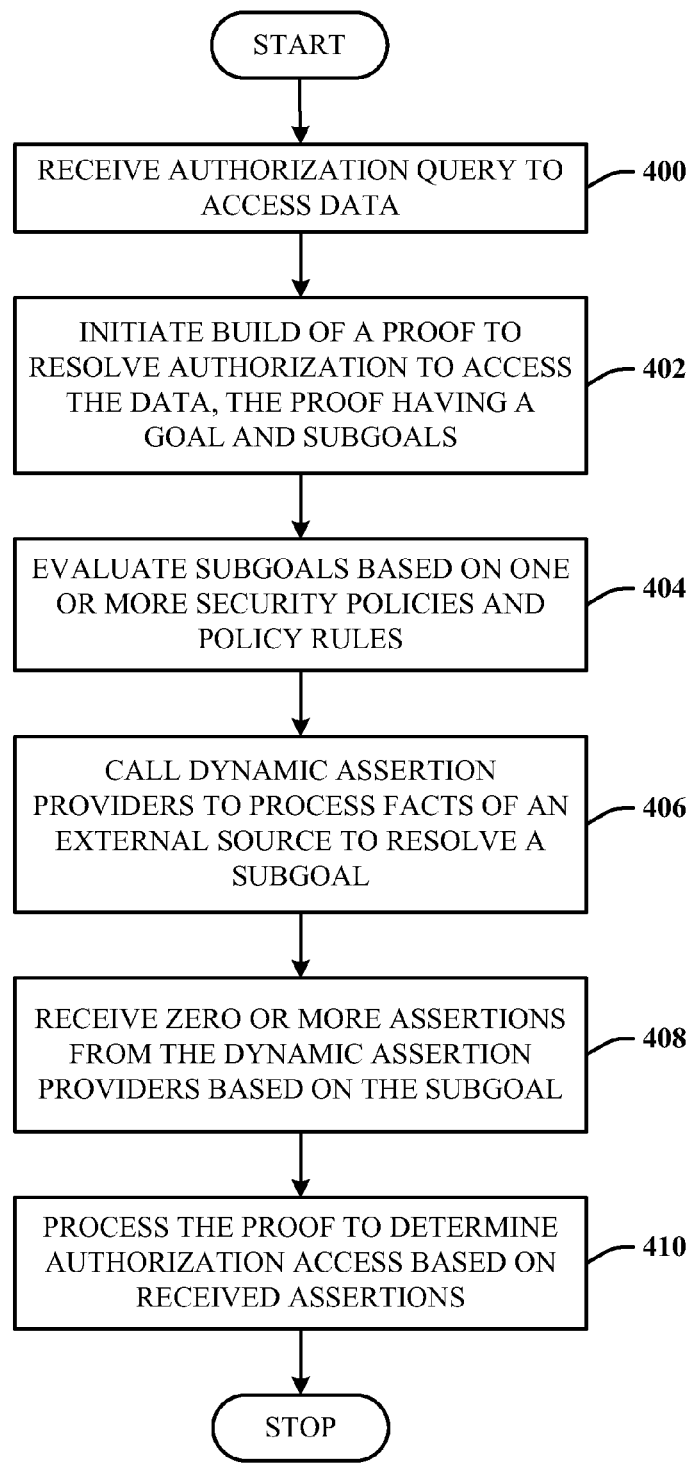
FIG. 4 illustrates a computer-implemented security method in accordance with the disclosed architecture.

FIG. 4 illustrates a computer-implemented security method in accordance with the disclosed architecture. At 400, an authorization query to access data is received. At 402, build of a proof is initiated to resolve authorization to access the data, the proof having a goal and subgoals. At 404, subgoals are evaluated based on one or more security policies and policy rules. At 406, dynamic assertion providers are called (e.g., all providers) to process facts of an external source to resolve a subgoal. At 408, zero or more assertions are received from the dynamic assertion providers based on the subgoal. At 410, the proof is processed to determine authorization access based on received assertions.

Figure 5:
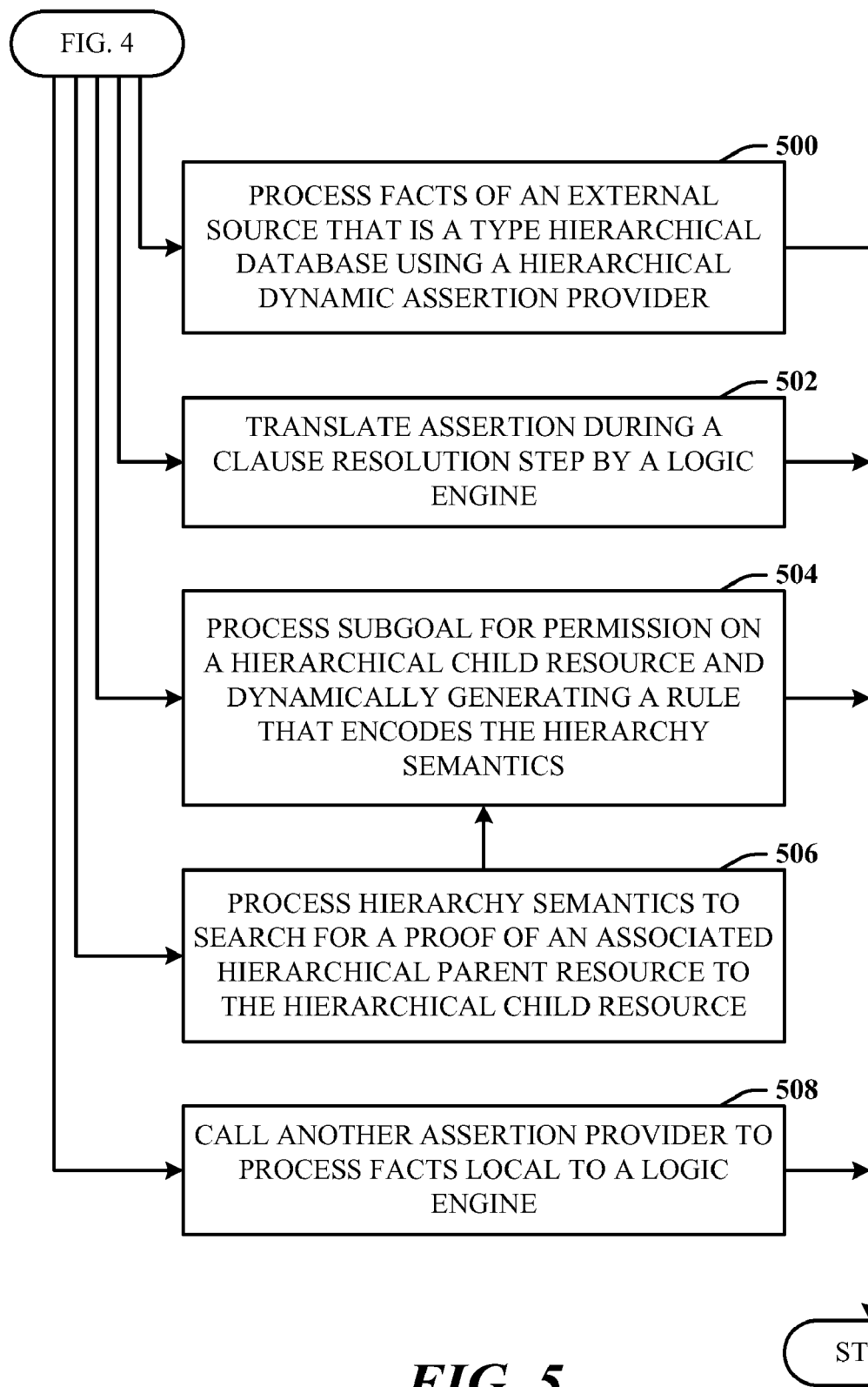
FIG. 5 illustrates further aspects of the method of FIG. 4.

FIG. 5 illustrates further aspects of the method of FIG. 4. At 500, facts of an external source that is a type hierarchical database are processed using a hierarchical dynamic assertion provider. At 502, the assertion is translated during a clause resolution step by a logic engine. At 504, the subgoal is processed for permission on a hierarchical child resource and dynamically generating a rule that encodes the hierarchy semantics. At 506, the hierarchy semantics are processed to search for a proof of an associated hierarchical parent resource to the hierarchical child resource. At 508, another assertion provider is called to process facts local to a logic engine.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
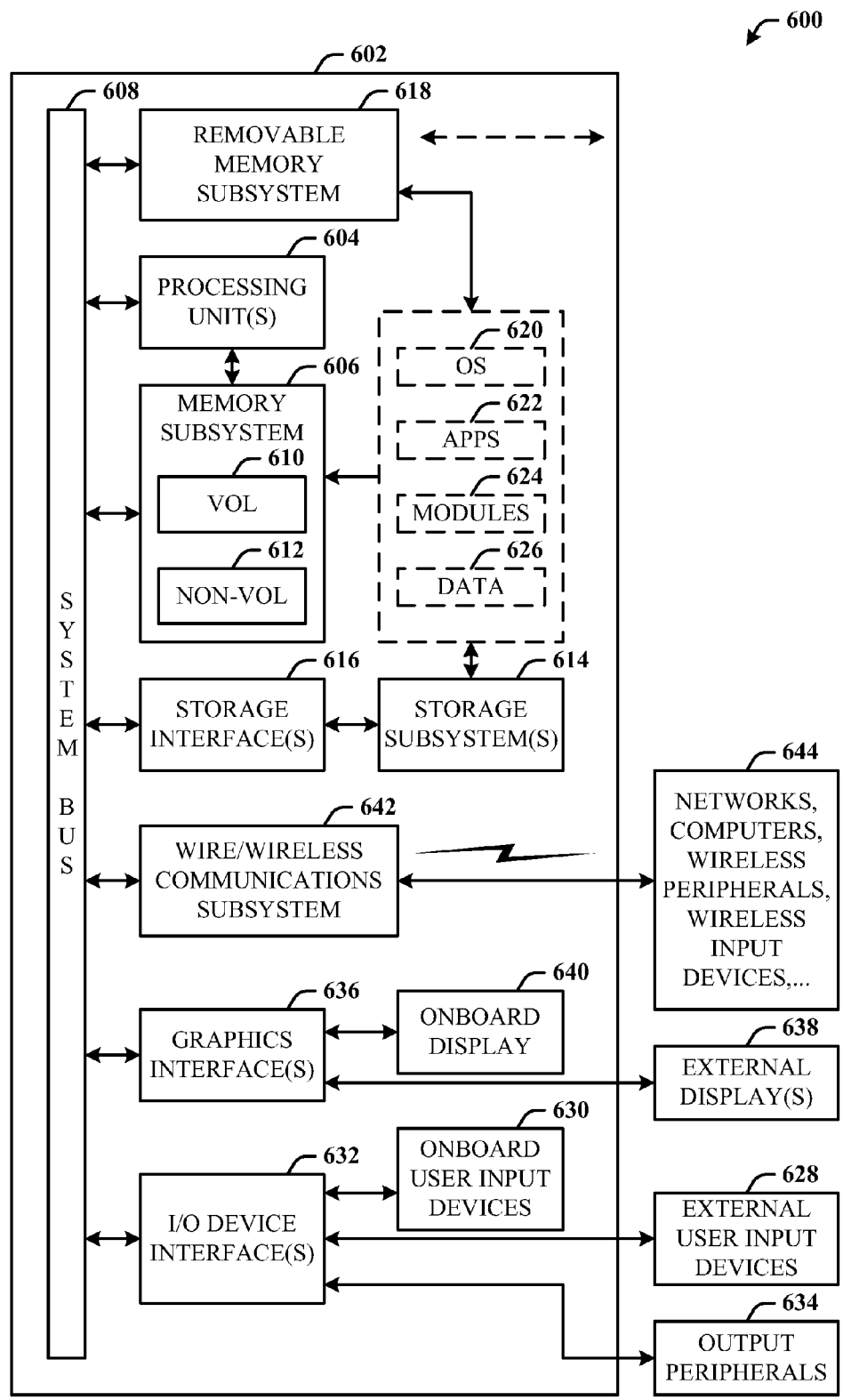
FIG. 6 illustrates a block diagram of a computing system that executes dynamic assertion providers designed for a logic-based security policy language in accordance with the disclosed architecture.

Referring now to FIG. 6, there is illustrated a block diagram of a computing system 600 that executes dynamic assertion providers designed for a logic-based security policy language in accordance with the disclosed architecture. In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The one or more application programs 622, other program modules 624, and program data 626 can include the entities and components of the system 100 of FIG. 1, the entities and components of the system 200 of FIG. 2, the entities and components of the system 300 of FIG. 3, and the methods represented by the flowcharts of FIGS. 4-5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented security system, comprising:
    a security policy engine component that employs a logic-based security language to process an authorization query, the engine component initiates build of a proof having a goal and subgoals to be resolved to process the query;
    an assertion provider component that includes assertion providers that process facts to generate and return an assertion to the security policy engine component to resolve a subgoal of the proof, the assertion providers comprise a dynamic assertion provider to process facts of an external source to resolve the subgoal and a hierarchy assertion provider that defines hierarchy types for processing type hierarchies, the hierarchy assertion provider receives a subgoal for permission on a hierarchical child resource and dynamically generates a rule that encodes hierarchy semantics, the engine component processes the hierarchy semantics to search for a proof of an associated hierarchical parent resource to the hierarchical child resource; and
    a microprocessor that executes computer-executable instructions associated with at least one of the security policy engine component or the assertion provider component.

2. The system of claim 1, wherein the assertion provider component includes a type provider that defines types for processing hierarchical type ontologies.

3. The system of claim 1, wherein the assertion provider component facilitates access to external sources of facts not accessible by the engine component.

4. The system of claim 1, wherein the assertion provider component returns an assertion expressed in the logic-based security language for processing as part of the proof.

5. The system of claim 1, wherein the security policy engine component fetches and dynamically translates the assertion during a clause resolution step.

6. The system of claim 1, wherein the logic-based security language includes a safety condition that guarantees termination of a query evaluation process based on an infinite set of assertions returned by an assertion provider.

7. The system of claim 1, wherein the hierarchy assertion provider defines type hierarchy and dynamically provides relevant facts on-demand as a proof procedure progresses.

8. The system of claim 1, further comprising a language layer where a subgoal is converted into a security language statement of the logic-based security language, which is a query and rule language for deductive databases.

9. The system of claim 1, further comprising a hierarchy layer that includes a resource hierarchy provider for hierarchical uniform resource identifiers.

10. A computer-implemented security system, comprising:
    a security policy engine component that employs a logic-based security language to process an authorization query, the engine component initiates build of a proof having a goal and subgoals to be resolved to process the query, the security policy engine component fetches and dynamically translates an assertion during a clause resolution step;
    an assertion provider component includes one or more assertion providers that process facts to generate and return an assertion to the security policy engine component to resolve a subgoal of the proof, the assertion provider component comprises a dynamic assertion provider to process facts from external sources of facts not accessible by the engine component and a hierarchy assertion provider that defines hierarchy types for processing type hierarchies, the hierarchy assertion provider receives a subgoal for permission on a hierarchical child resource and dynamically generates a rule that encodes hierarchy semantics, the engine component processes the hierarchy semantics to search for a proof of an associated hierarchical parent resource to the hierarchical child resource; and
    a microprocessor that executes computer-executable instructions associated with at least one of the security policy engine component or the assertion provider component.

11. The system of claim 10, wherein the assertion provider component includes a type provider that defines types for processing hierarchical type ontologies.

12. The system of claim 10, wherein the assertion provider component returns an assertion that is expressed in the logic-based security language for processing as part of the proof.

13. The system of claim 10, wherein the logic-based security language includes a safety condition that guarantees termination of a query evaluation process based on an infinite set of assertions returned by an assertion provider.

14. The system claim 10, wherein the assertion provider component includes assertion providers that work on a same data source or each operate on separate areas of the same data source.

15. A computer-implemented security method, comprising acts of:
    receiving an authorization query to access data;
    initiating build of a proof to resolve authorization to access the data, the proof having a goal and subgoals;
    evaluating subgoals based on one or more security policies and policy rules;
    receiving a subgoal for permission on a hierarchical child resource;
    dynamically generating a rule that encodes hierarchy semantics;
    processing the hierarchy semantics to search for a proof of an associated hierarchical parent resource to the hierarchical child resource;
    calling dynamic assertion providers to process facts of an external source to resolve a subgoal;
    receiving zero or more assertions from the dynamic assertion providers based on the subgoal;
    processing the proof to determine authorization access based on received assertions; and
    configuring a processor to execute machine-readable instructions stored in a memory.

16. The method of claim 15, further comprising processing facts of an external source that is a type hierarchical database using a hierarchical dynamic assertion provider.

17. The method of claim 15, further comprising translating the assertion during a clause resolution step by a logic engine.

18. The method of claim 15, further comprising processing the subgoal for permission on a hierarchical child resource and dynamically generating a rule that encodes hierarchy semantics.

19. The method of claim 18, further comprising processing the hierarchy semantics to search for a proof of an associated hierarchical parent resource to the hierarchical child resource.

20. The method of claim 15, further comprising calling another assertion provider to process facts local to a logic engine.

* * * * *